Feb. 12, 1935.　　　　　G. BUCKY　　　　　1,991,192

OIL TANK LEVEL INDICATOR

Filed June 27, 1934　　　2 Sheets-Sheet 1

WITNESS

INVENTOR
GUSTAV BUCKY
BY
ATTORNEYS

Feb. 12, 1935.                    G. BUCKY                  1,991,192
                         OIL TANK LEVEL INDICATOR
                         Filed June 27, 1934    2 Sheets-Sheet 2

WITNESS

INVENTOR
GUSTAV BUCKY
BY
ATTORNEYS

Patented Feb. 12, 1935

1,991,192

UNITED STATES PATENT OFFICE 1,991,192

OIL TANK LEVEL INDICATOR

Gustav Bucky, New York, N. Y.

Application June 27, 1934, Serial No. 732,594

10 Claims. (Cl. 88—2.2)

The present invention relates to apparatus for optically determining the level of the liquid contained in a tank, for instance, an oil tank. More specifically, the invention consists in the provision of a compartment or casing adapted to be screwed into an opening in the roof of the tank, such casing carrying a tube in the upper end of which is positioned a light bulb, the rays of light from such bulb being adapted to pass through a lens and then through a slit in a disc positioned at the bottom extremity of the tube, so that a beam of light is directed against the surface of the liquid within the tank and is reflected therefrom upwardly into a chamber containing a ground glass element provided with a calibrated scale for directly reading therefrom the level of the liquid in the tank or the corresponding volumetric contents of such tank.

Figure 1:
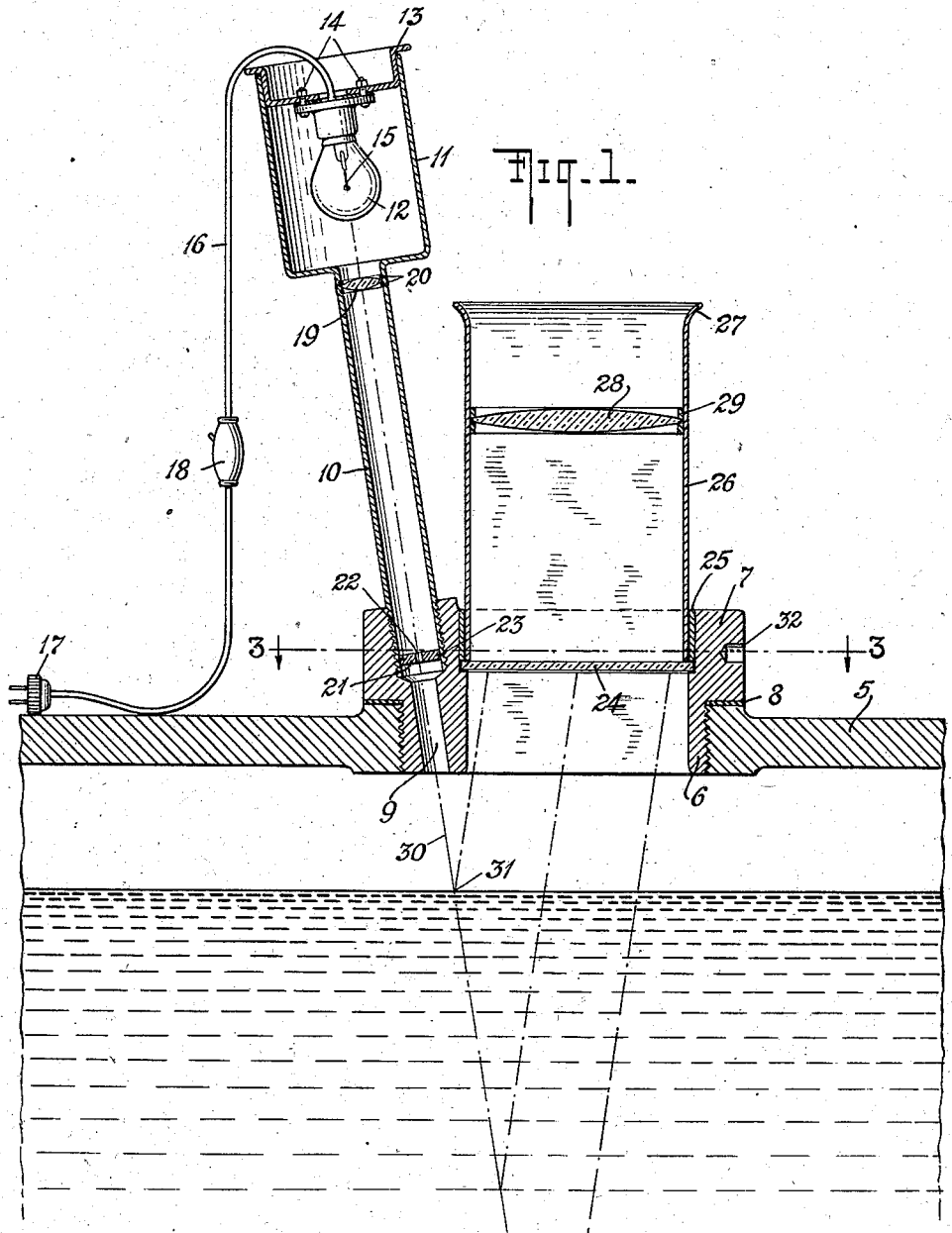
Figure 2:
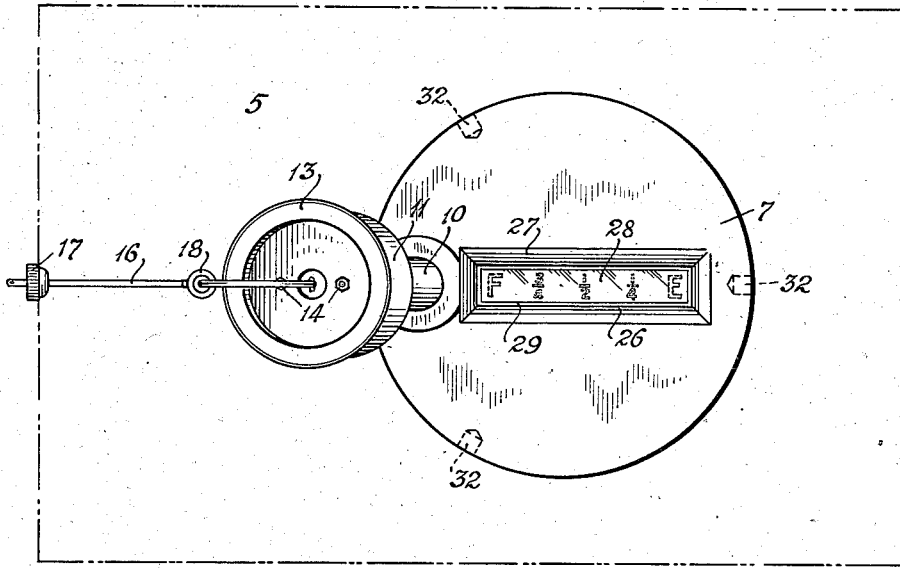
Figure 3:
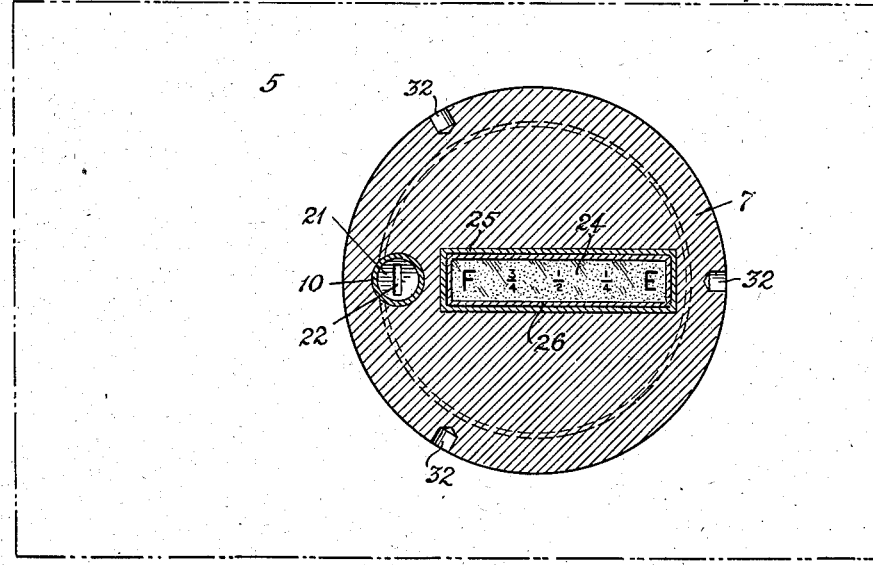

A particular embodiment of the invention is illustrated in the accompanying drawings in which Fig. 1 is a sectional view of the apparatus as applied to the roof of the tank; Fig. 2 is a plan view of the device; and Fig. 3 is a section on the line 3—3 of Fig. 1.

Referring more particularly to the drawings, in which similar reference characters identify similar parts in the several views, 5 indicates the roof of the oil tank, shown in section, having an aperture, the sides of which are threaded to receive the threaded depending portion 6 of a casing 7, a gasket 8 being provided between the flanged portion of the casing and the upper surface of the roof 5 with which such flanged portion is adapted to contact. The casing 7 at one side thereof is drilled, at an angle to the vertical, to provide an aperture 9, a tube 10 of any suitable material being threaded at its bottom portion so as to cooperate with threading provided on the inner periphery of the aperture 9 at the upper portion thereof, which may be made of larger diameter than the lower portion thereof, as clearly shown in Fig. 1. The tube 10 is formed with an integral compartment 11 at the upper end thereof of larger diameter than the tube so as to accommodate a light bulb 12 secured upon a removable cover 13 by means of bolts 14, 14. The lamp 12 is preferably of the type having a single straight filament 15. The source of current for the lamp is provided by electric cord 16 which may be connected to the main circuit by plug 17. A switch 18 of any conventional form is provided to control the electric circuit. Within the tube 10, preferably immediately below the compartment 11, is positioned a focusing lens 19 of the double convex type mounted within the tube by means of a pair of rings 20.

Near the lower extremity of the tube 10 is mounted a disc 21 having a narrow slit 22, the disc being retained within the tube by means of screws 23.

Secured within the casing 7 and seated upon suitable flanges extending into the opening thereof, is a rectangular strip of ground glass 24 provided with notations in the nature of a graduated scale. The glass strip is retained within the casing 7 permanently by means of a rectangular wall structure 25 lining the inner periphery of the casing aperture above such ground glass. Extending upwardly from within the aperture in the casing 7 is a rectangular chamber 26 of metal or any other suitable material having its upper edges flared as at 27. Within the chamber or tubing 26 is mounted a double convex lens 28 secured within the tubing by means of ledges 29, the lens 28 being provided for obtaining a more accurate reading of the position of the beam of light reflected to and against the graduated scale upon the glass strip.

The operation of my novel device is as follows:

When an indication of the level of the liquid in the oil tank to which my novel device has been applied is desired, the switch 18 is turned on so as to light the bulb 12. The rays of light emanating from the bulb pass through the lens 19 and are made parallel thereby. A narrow beam of such parallel rays of light is shaded out by the slit 22 of the disc 21, the beam being reflected from the surface of the oil within the tank, the reflected beam of light striking the ground glass 24 indicating, by the position of such reflected beam with respect to the scale provided upon such ground glass, the particular level of the oil within the tank. Thus, if the tank is full, the beam of light 30 will be reflected from the surface of the oil at 31 and will strike the ground glass 24 at a point thereon carrying the legend F indicating that the tank is full. The graduated scale upon the ground glass 24 may be read more easily by reason of the magnification of the scale by the lens 28 secured within the light chamber 26.

It will be noted from an examination of Fig. 1 that as the level of the liquid within the tank recedes the beam of light passing through the aperture 9 will be reflected from the surface of the liquid so as to strike the ground glass 24 at different portions throughout its length and thus indicate the exact level of the liquid or the particular volumetric contents of the tank. If the tank is empty the beam of light 30 will be reflected from the bottom surface of the tank to a point on the ground glass 24 at which appears the legend E, indicating that the tank is empty. Between the legends F and E, the ground glass 24 is provided with notations indicating the proportionate volumetric contents of the tank, such as one-quarter, one-half and three-quarters, or the ground glass 24 may be provided with a graduated scale indicating particular volumetric contents depending upon the size of the tank to which the apparatus is applied.

For facilitating the attachment of the casing 7 and the tube 10 and chamber 26 carried thereby to the roof of the tank, I provide tapped recesses 32 within which may be inserted the projections of a spanner wrench by means of which the casing 7 may be threaded into the tank roof.

While I have described a specific embodiment of my invention, it is obvious that various modifications therein, particularly in the arrangement of the several parts, may be made therein without departing from my invention.

I claim:

1. An apparatus for optically determining the level of liquid in a tank comprising a casing adapted to be secured into the roof of the tank, said casing having an aperture passing therethrough at an angle to the vertical, a tube secured within said aperture and having a source of light at the upper terminus thereof, a lens within said tube in the path of the rays of light emanating from said light source, a disc having a slit therein for separating a narrow beam from said rays of light, a second aperture within said casing, and a ground glass strip, positioned within said second aperture of the casing and provided with scale indications, to and against which the beam of light reflected from the surface of the liquid within the tank is directed.

2. The apparatus claimed in claim 1 including a lens positioned above the ground glass strip provided with a graduated scale.

3. An apparatus for optically determining the liquid level in a tank comprising a compartment adapted to be secured within the roof of the tank, a tube extending from said compartment at an angle to the vertical, a light source within said tube, a lens below said light source, a disc having a slit positioned within said tube, a light tube extending from said casing at one side of said tube, a glass strip at the bottom of said light tube provided with a graduated scale indicating the level of the liquid in the tank by the position thereon of a beam of light passing through said tube and reflected by the surface of the liquid to said glass strip.

4. In combination, an enclosed container for liquids, means to project a stationary beam of light against the surface of the liquid within said container at an angle to the vertical, an aperture in the wall of said container, translucent material associated with said aperture, said aperture and said translucent material being so positioned and of such dimensions that the reflected portion of the light beam impinges against said translucent material whether the container is full, partly full or empty, and a scale for indicating the level of the liquid in said container by the relative position of the point of impact of the reflected light beam upon said translucent material.

5. In combination, an enclosed container for liquids, a stationary source of light positioned exteriorly of said container, means for directing a relatively narrow light beam from said source against the surface of the liquid within said container at an angle to the vetrical, an aperture in the wall of said container, translucent material extending transversely of said aperture, said aperture and said translucent material being so positioned and of such dimensions that the reflected portion of the light beam impinges against said translucent material whether the container is full, partly full or empty, and a scale for indicating the level of the liquid of said container by the relative position of the point of impact of the reflected light beam upon said translucent material.

6. In combination, an enclosed tank, a relatively small aperture adapted to enable a beam of light to pass into the interior of the tank at an angle to the vertical, a stationary source of light positioned exteriorly of said tank, means for directing a light beam from said source through said aperture at said angle to the vertical, a second aperture, translucent material associated with said second aperture, said second aperture and said translucent material being so positioned relative to said inclined aperture and of such dimensions that the reflected portion of the light beam impinges against said translucent material whether the container is full, partly full or empty, and a scale for indicating the level of the liquid in said container by the relative position of the point of impact of the reflected light beam upon said translucent material.

7. An enclosed container for liquids adapted for the periodic withdrawal of contents thereof, and means associated with the container for disclosing the amount of the liquid contents thereof at any time, said means being wholly free from all moveable mechanical parts and comprising a source of light, means for projecting a beam from said source of light against the surface of the liquid within the container and the interior bottom of the container when empty at an angle to the vertical and means for rendering the reflected portion of the beam visible from the exterior of the container, said last named means being so positioned and dimensioned relative to the beam to be reflected and the depth of the container that the beam of reflected light will automatically move to a new position within the field of visibility as the surface of the liquid varies and thereby indicate by its position in said field whether the container is full, partly full, how full or entirely empty.

8. An enclosed container adapted for the periodic withdrawal of contents thereof, and means associated with the container for disclosing the amount of the liquid contents thereof at any time, said means being wholly free from all movable mechanical parts and comprising a stationary source of light, means for directing a fixed beam of light from said source against the surface of the liquid within the container and the interior bottom of the container when empty, at an angle to the vertical, and means for rendering a transverse section of that portion of the beam which is reflected from the surface of the liquid or the bottom of the container at the same angle from the vertical that the beam was originally directed, visible from the exterior of the container upon a fixed field of predetermined dimensions at all levels of the liquid in said container.

9. An apparatus such as set forth in claim 8 in which the means for rendering a transverse section of the beam of reflected light visible comprises a screen which is so dimensioned relative to the depth of the container that the illuminated section of said beam will move within the boundaries of said screen and will indicate by its position on said screen whether the container is full, partly full or entirely empty.

10. An apparatus such as set forth in claim 8 in which the means for rendering a transverse section of the beam of reflected light visible comprises a screen which is so dimensioned relative to the depth of the container that the illuminated section of said beam will move within the boundaries of said screen, and a scale associated with said screen for giving a direct reading of the volumetric contents of the container by the relative position of the section of the reflected beam upon said screen.

GUSTAV BUCKY.